May 10, 1932.  O. H. HANSEN  1,857,450

PROCESS OF HEAT TREATING EDIBLE SUBSTANCES

Filed Jan. 28, 1931  2 Sheets-Sheet 1

INVENTOR
O. H. Hansen
BY
Morsell & Morsell
ATTORNEYS.

May 10, 1932.   O. H. HANSEN   1,857,450
PROCESS OF HEAT TREATING EDIBLE SUBSTANCES
Filed Jan. 28, 1931    2 Sheets-Sheet 2

INVENTOR
O. H. Hansen
BY
Morsell & Morsell
ATTORNEYS

Patented May 10, 1932

1,857,450

UNITED STATES PATENT OFFICE

OSWALD H. HANSEN, OF CEDARBURG, WISCONSIN

PROCESS OF HEAT TREATING EDIBLE SUBSTANCES

Application filed January 28, 1931. Serial No. 511,663.

The present invention relates to new and useful improvements in the art of sterilizing food products and of sealing the same in the containers in which the products are to be subsequently marketed.

An object of the invention is to provide a process of effectively heat treating edible substances in preparation for the marketing thereof in sealed containers.

Another object of the invention is to provide a process whereby food products may be rendered sterile through direct contact of a heating medium with the product, and without detrimental effect upon the food.

A further object of the invention is to provide a process whereby liquid sterilizing medium carrying sufficient heat units for quickly rendering a food product sterile, may be brought into direct contact with the food product while the medium is in liquid form.

A still further object of the invention is to provide a process whereby a sterilizing liquid medium heated to a temperature above the normal boiling point thereof and maintained in liquid form by pressure, may be utilized to effect sterilization of food products.

Another object of the invention is to provide a process whereby a liquid sterilizing medium heated to a temperature above the normal boiling point thereof and maintained under sufficient pressure to prevent boiling, may be brought into direct contact with the food product subjected to similar pressure so as to render the food product sterile, and whereby said food product while subjected to high temperature and under pressure, may be sealed in a container to render the same permanently sterile.

A further object of the invention is to provide a process of preserving food products by subjecting the same to a sterilizing medium such as liquid containing sufficient heat units to not only sterilize the food product itself, but also the confining surface of a container in which the product is hermetically sealed for marketing purposes.

These and other objects will in part be obvious and will in part be hereinafter more fully disclosed.

A clear conception of the several steps constituting the improved method of heat treating edible substances and of one embodiment of apparatus for effecting commercial exploitation thereof, may be had by referring to the drawings accompanying and forming a part of this specification in which like reference characters designate the same or similar parts in the several views.

Some of the novel features of liquid measuring and feeding devices, shown but not specifically claimed herein, form the subject of co-pending application Serial Number 432,608, filed March 3rd, 1930.

In accordance with the present improvement, one kind of material such as granular edible substance, is heat treated by mixing therewith another kind of material such as liquid containing sufficient heat units to effectively sterilize the entire mixture, while the materials are maintained under sufficient pressure during the mixing operation to prevent the generation of vapor or steam by the confined heat units. If solid material is to be heat treated, this material is preferably subjected to the pressure of the mixing zone, gradually in order to eliminate possible crushing thereof, and this may be done either in the manner disclosed in Patent No. 1,390,703, or otherwise. The finally sealed cans containing the hot mixture, are likewise preferably relieved from the pressure existing in the mixing zone, gradually in order to prevent disruption of the seams, while the containers are still under pressure and final sterilization is being effected. The heat treatment is permitted to continue from the time the heat is applied to the constituents of the mixture until after the receptacles containing the heated substances have been hermetically sealed and the external pressure released therefrom, it being necessary only to inject sufficient heat into the material to insure complete sterilization of the can and its contents after the containers have been sealed, in order to insure permanent preservation of the product.

While the heat units are preferably applied by utilizing a liquid such as brine or syrup, any fluent pulverulent material may be utilized for this purpose, and in case it is desired to finally pack only the granular material, the heating liquid may be withdrawn from the solid material after the heat transfer and before the latter material is concealed within the receptacles and permitted to cool. It may in some cases also be desirable to add cool liquid to the granular material after sterilization thereof and before packing, but these improvements in the mode of sterilizing dry packed materials and in the mode of effecting cooling by adding cool liquid to the previously sterilized granular material are being made the subject of separate applications.

Figure 1:
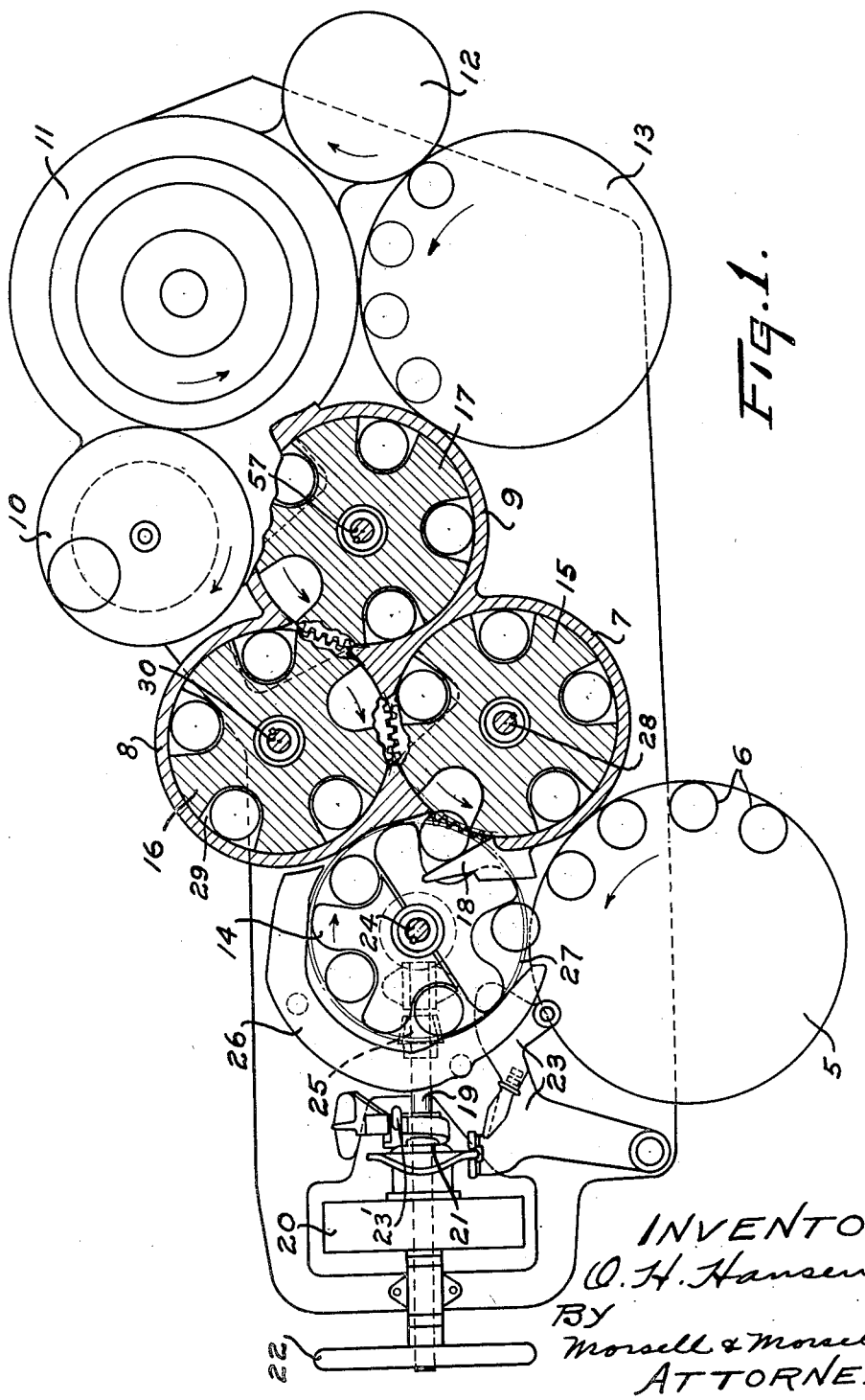
Fig. 1 is a relatively diagrammatic horizontal section through improved apparatus for automatically controlling the pressure upon and for mixing heated liquid with preheated granular material in order to heat treat the latter.

Referring to Fig. 1 of the drawings, the machine shown diagrammatically therein, comprises in general a rotary can supply disk 5; mechanism for delivering measured batches of granular material into the successive cans 6 received from the disk 5; a casing 7 and means for gradually subjecting the successive partially filled cans received from the granular material measuring mechanism, to the pressure of the mixing zone; a casing 8 and means associated therewith for mixing heated liquid with the granular material in the cans 6, under pressure; a casing 9 and means for gradually reducing the pressure on the loaded cans received from the mixing zone; a can cap feeder 10 for depositing caps upon the successive loaded cans; a closing machine 11 for attaching the caps and thus hermetically sealing the loaded cans 6; a can discharge valve 12 for the closing machine 11; and a final rotary discharge disk 13.

The can supply and discharge disks 5, 13, the granular material measuring and feeding mechanism, the cap feeder 10, the closing machine 11 and the discharge valve 12, are all of well-known construction, and therefore require no detailed disclosure, excepting as hereinafter indicated. The can supply disk 5 cooperates with a series of simultaneously rotatable rotors 14, 15, 16, 17, to transport the cans 6 in succession through the machine, and stationary can transfer guides 18 are associated with these rotors wherever necessary, in order to transfer the successive cans 6 from one rotor to the next. The various movable parts of the machine, are operated in unison from a common driving shaft 19 to which power is normally delivered through a pulley 20 and a clutch 21, but which may also be rotated manually with the aid of a hand wheel 22. The clutch 21 may be actuated manually by manipulation of a lever 23′, and is automatically operable to stop the machine when no cans 6 are delivered by the supply disk 5 to the rotor 14, by means of stop mechanism 23 of well-known construction.

The can transporting rotor 14 of the granular material measuring and feeding mechanism, is secured to an upright shaft 24 which is driven by the shaft 19 through bevel gearing 25, and the shaft 24 also drives the granular material measuring devices which deliver the measured batches of said material to the successive cans 6 while they are being transported around the shaft 24 within the fixed guide 26, by the rotor 14. A spur gear 27 secured to the shaft 24, meshes with a gear or with peripheral teeth on the supply disk 5, and also meshes with peripheral teeth on the rotor 15, thereby revolving these parts in the direction indicated by the arrows in Fig. 1. During transportation of the partially filled cans 6 within the casing 7 around the centering shaft 28 of the rotor 15, the successive cans are confined within pockets as shown, and are gradually subjected to increasing pressure and temperature by admission of steam or other fluid under pressure to the confining pockets. This gradual increase in pressure continues until any desired degree of pressure, preferably about that of the mixing zone, has been applied to the cans 6 and their granular contents, whereupon the cans are transferred to the mixing rotor 16 which is revolving within the casing 8.

Figure 2:
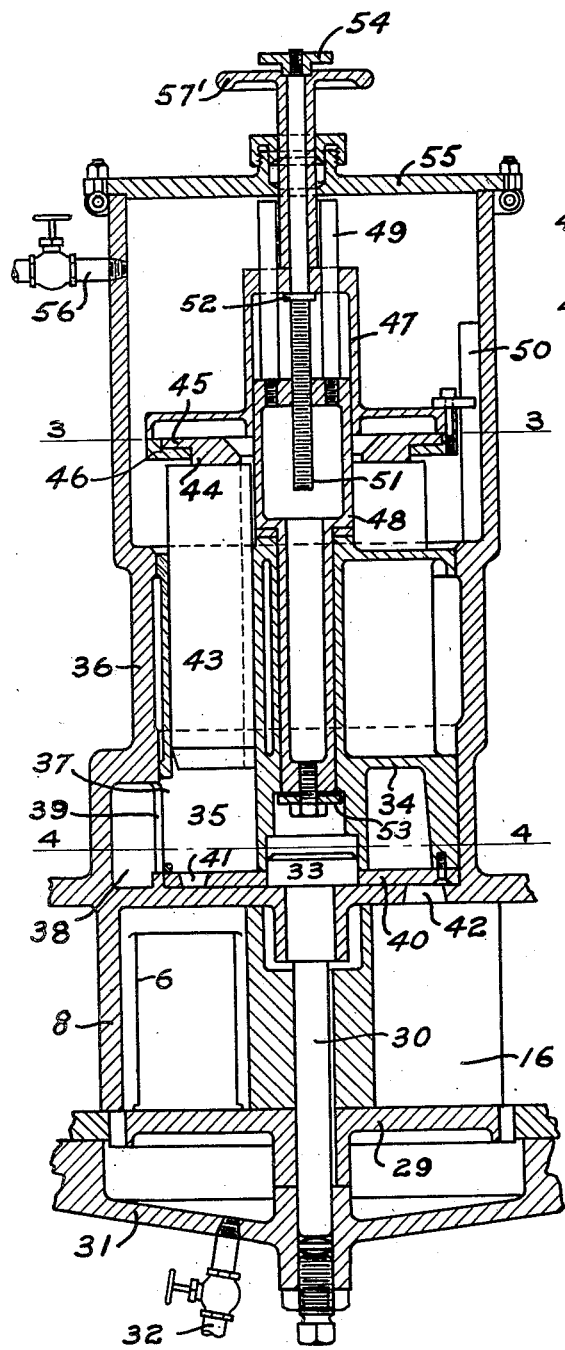
Fig. 2 is an enlarged central vertical section through an improved liquid heating and measuring device for delivering pre-measured batches of a heated liquid to successive cans containing measured batches of granular edible substance which is to be heat treated, while the cans are confined under pressure, the section being taken along the line 2—2 of Fig. 3.
Figure 3:
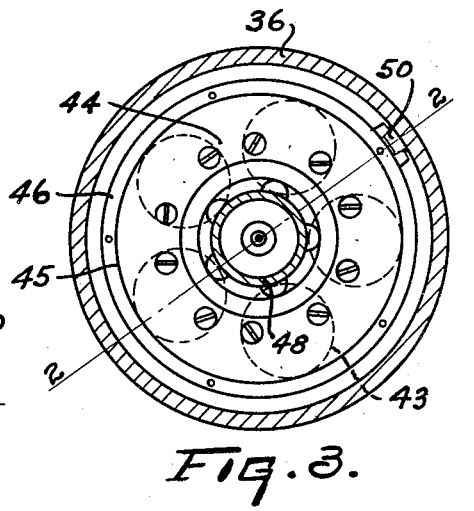
Fig. 3 is a horizontal section through the heating and measuring device, the section being taken along the line 3—3 of Fig. 2.
Figure 4:
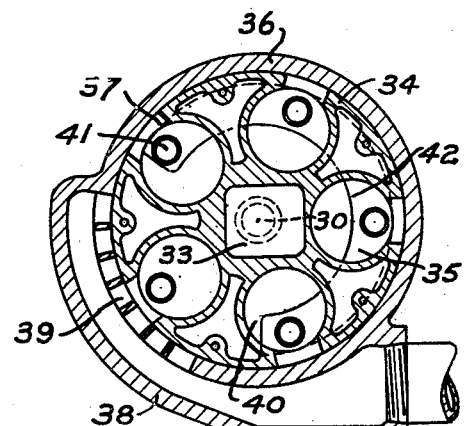
Fig. 4 is a horizontal section through the heating and measuring device, the section being taken along the line 4—4 of Fig. 2.

The means associated with the casing 8 for heating and for mixing measured batches of pre-heated liquid with the measured batches of granular material in the successive cans 6 delivered to the mixing zone, are shown in detail in Figs. 2, 3 and 4. The rotor 16 consists of a chamber forming element and a can supporting disk 29 both of which are keyed to an upright shaft 30, and the latter of which has peripheral teeth meshing with those of the rotor 15. By this means, rotary motion is imparted to the shaft 30 which is supported in bearings in the casing 8 and in a lower member 31 which forms a header for establishing any desired pressure within the mixing chambers of the rotor 16. Fluid under pressure may be admitted to the header through a pipe 32, and the pressure may readily be controlled by manipulation of a valve in this pipe. The upper end of the shaft 30 is provided with a driving head 33 which is detachably cooperable with a socket formed in the lower portion of a rotor 34 having an annular series of five liquid measuring pockets 35 formed therein.

The rotor 16 is entirely concealed within a housing 36 formed integral with the casing 8 and has annular peripheral surfaces snugly fitting bored surfaces of the housing. The successive measuring pockets 35 of the rotor 34 have side openings 37 which are communicable in succession with a heated liquid supply manifold 38 through openings 39, as the rotor 34 is rotated, and the lower extremity of the measuring rotor is provided with a plate 40 having discharge openings 41 therein which are successively communicable with an arcuate delivery slot 42 formed in the casing 8 above the mixing chambers of the rotor 16. Liquid such as pre-sterilized hot brine, is admitted to the manifold 38 from any suitable source, and as the pockets 35 pass the openings 39, they receive and measure batches of the hot brine which are subsequently delivered through the openings 41 and slot 42 to the successive cans 6 containing batches of granular material, as these cans are transported through the mixing casing 8 by the rotor 16.

In order to permit accurate determination of the volumes of the batches of heating liquid thus measured, each of the pockets 35 is provided with a vertically movable plunger 43, all of these plungers being rigidly attached to an adjusting plate 44 which is rotatable with the rotor 34 and has a peripheral flange 45 rotatably associated with the flange 46 of a non-rotary but vertically adjustable element 47. The element 47 is centered upon the rotor 34 by means of a column 48 fitting a bore in the rotor and having pins 49 coacting with holes in the element 47 in order to prevent rotation of the column while permitting vertical displacement of the element 47 relative to the column 48. The element 47 is fixed against rotation by means of a spline 50 and is vertically adjustable relative to the column 48 and to the rotor 34 by means of a spindle 51 having screw threads coacting with the column 48, and also having a collar 52 coacting with an under surface of the element 47. The column 48 is prevented from moving vertically relative to the rotor 34, by means of a plate 53, and the spindle 51 is rotatable by means of a hand wheel 54. This arrangement of elements is obviously such, that when the hand wheel 54 is manipulated, the plungers 43 will be moved up or down relative to the measuring pockets 35 thereby simultaneously varying the volumes of all of the pockets. The housing 36 is moreover provided with a removable top closure 55, and with a heating fluid admission pipe 56 for maintaining the interior of the housing under the desired pressure and temperature. In order to permit ready removal of the liquid measuring structure, a handle 57' may also be provided, and this handle obviously permits free upward removal of the structure from within the housing 36 upon release of the closure 55.

When the successive cans 6 have been supplied with a proper quantity of mixture during transportation thereof through the casing 8, the cans are delivered in succession to the pockets of the rotor 17 disposed within the casing 9. During transportation of the mixture laden cans 6 through the casing 9 and about the centralizing shaft 57 of the rotor 17, the external pressure is gradually reduced and the cans are eventually delivered to the cap feeder 10. The feeder 10 delivers caps or covers to the successive cans while the same are still under slight external pressure, and the covers are finally attached to the cans in the closing machine 11 while the external pressures are still above atmospheric. The finally filled and hermetically sealed cans 6 are subsequently discharged through the valve 12 to the discharge disk 13. Although the loaded cans are subjected to atmospheric pressure when delivered to the disk 13, the internal temperature and pressure may still be considerably above atmospheric, and sterilization may still be taking place. The cans may subsequently be delivered to a cooler or allowed to cool under atmospheric conditions, as desired, and complete sterilization is finally effected when the entire mass of each batch of mixture has been reduced to atmospheric temperature and the pressure within the cans has been reduced slightly below atmospheric pressure.

From the foregoing description, it will be apparent that the successive measured batches of granular material may be quickly and effectively sterilized by properly controlling the temperature of the sterilizing liquid. While the apparatus specifically disclosed is capable of mixing the hot liquid with the measured batches of granular material within the cans, this mixture of hot liquid and granular material may obviously be accomplished in measuring chambers other than the cans themselves. The temperature of the heating liquid should be such as to avoid generation of vapor such as steam, and sterilizing temperatures can readily be attained without generating vapors, by establishing proper pressures within the mixing zones. The heating liquid may, by proper control of the pressure, be superheated, thereby insuring injection of sufficient heat units into each batch of granular material, to effectively sterilize not only the granular material itself, but also the interior of the can and the surface of the can, cap or cover which is ultimately exposed to the interior of the can. The rotation of the transporting rotors should be at such speed that the desired gradual increase and decrease in pressure are obtained, and the delay in finally cooling the hermetically sealed product should be such as to insure complete sterilization prior to final cooling.

While the improved process embodies certain features of the prior art hereinabove referred to, it will be apparent that the present process is more flexible than any of the prior processes and permits effective sterilization of a much wider range of food products. The sterilization is not only quickly and effectively accomplished, but complete sterilization of both the food and of the can is accomplished in one operation. It will also be apparent that the process is capable of being exploited in apparatus other than that disclosed diagrammatically herein, and it is within the contemplation of the present improvement to either finally pack the granular material while mixed with its heating liquid, or to remove the heating liquid prior to final packing, or to remove the heating liquid and subsequently add sterilized cooling liquid prior to packing.

It should, therefore, be understood that it is not desired to limit the invention to the exact disclosure made herein, for various modifications within the scope of the appended claims may occur to persons skilled in the art.

It is claimed and desired to secure by Letters Patent:

1. The process of sterilizing and packing food products consisting in placing a food product under pressure above atmospheric, causing a liquid, heated to a temperature sufficient to sterilize the food product and above that at which the liquid normally boils and maintained under pressure sufficient to prevent boiling, to contact with the food product for rendering the same sterile, and sealing the same in a container.

2. The process of sterilizing and packing food products consisting in placing a food product under pressure above atmospheric, causing a liquid, heated to a temperature sufficient to sterilize the food product and above that at which the liquid normally boils and maintained under pressure sufficient to prevent boiling, to contact with the food product for rendering the same sterile, and sealing the same in a container while at a high temperature and under pressure.

3. The process of sterilizing and packing food products consisting in placing the food product under pressure above atmospheric, causing a liquid medium containing a large percent of water and heated to a temperature above 212° F. and maintained under pressure sufficient to prevent boiling to contact with the food product for rendering the same sterile, and sealing the same in a container.

4. The process of sterilizing and packing food products consisting of subjecting the product to pressure above atmospheric, rendering the product sterile by causing the same while under said pressure to contact with a liquid heated to a temperature sufficient to sterilize the food product and above the normal boiling point of the liquid, and sealing the heat treated product in a container.

5. The process of sterilizing and packing food products consisting of subjecting the product to pressure above atmospheric, rendering the product sterile by causing the same while under said pressure to contact with a liquid heated to a temperature sufficient to sterilize the food product and above the normal boiling point of the liquid, and sealing the heat treated product in a container while at high temperature and subjected to pressure.

6. The process of sterilizing and packing food products consisting of rendering the product sterile by causing the same to contact with a liquid heated to a temperature sufficient to sterilize the food product and above its normal boiling point and subjected to pressure sufficient to prevent boiling, and sealing the heat treated product in a container.

7. The process of sterilizing and packing food products consisting of rendering the product sterile by causing the same to contact with a liquid heated to a temperature sufficient to sterilize the food product and above its normal boiling point and subjected to pressure sufficient to prevent boiling, and sealing the heat treated product in a container while subjected to high temperature and pressure.

In testimony whereof I affix my signature.

OSWALD H. HANSEN.